ns011334483B2

(12) United States Patent
Chen

(10) Patent No.: US 11,334,483 B2
(45) Date of Patent: May 17, 2022

(54) NETWORK FABRIC STORAGE SYSTEM

(71) Applicant: Dell Products L.P., Round Rock, TX (US)

(72) Inventor: Xu Chen, Shanghai (CN)

(73) Assignee: Dell Products L.P., Round Rock, TX (US)

(*) Notice: Subject to any disclaimer, the term of this patent is extended or adjusted under 35 U.S.C. 154(b) by 189 days.

(21) Appl. No.: 16/672,029

(22) Filed: Nov. 1, 2019

(65) Prior Publication Data
US 2021/0157724 A1 May 27, 2021

(30) Foreign Application Priority Data
Oct. 16, 2019 (CN) .......................... 201910983986.1

(51) Int. Cl.
*G06F 3/00* (2006.01)
*G06F 12/0802* (2016.01)
*G06F 3/06* (2006.01)

(52) U.S. Cl.
CPC ........ *G06F 12/0802* (2013.01); *G06F 3/0604* (2013.01); *G06F 3/067* (2013.01); *G06F 3/0655* (2013.01); *G06F 2212/72* (2013.01)

(58) Field of Classification Search
None
See application file for complete search history.

(56) References Cited

U.S. PATENT DOCUMENTS

| 10,185,624 B2* | 1/2019 | Akutsu | ............... H04L 67/1097 |
| 10,761,728 B2* | 9/2020 | Hong | .................... G06F 3/0604 |
| 10,762,023 B2* | 9/2020 | Olarig | ................. G06F 13/4022 |

* cited by examiner

*Primary Examiner* — Midys Rojas
(74) *Attorney, Agent, or Firm* — Joseph Mencher

(57) ABSTRACT

A network fabric storage system includes a chassis housing primary storage devices and one or more cache devices that re separate from each of the primary storage devices. A Link Control Card (LCC) is housed in the chassis and coupled to each of the primary storage devices and the cache device(s) via a mid-plane. The LCC includes a translation layer processor that receives first data from a host device, and processes the first data for storage in the cache device(s) such that the first data is stored in the cache device(s). The translation layer processor then determines that the first data should be stored in a first primary storage device and, in response, causes the first data to be moved from the cache device(s) to the first primary storage device such that the first data is stored in the first primary storage device.

20 Claims, 6 Drawing Sheets

NETWORK FABRIC STORAGE SYSTEM

CROSS-REFERENCE TO RELATED APPLICATIONS

This application claims priority to Chinese Application Serial No. 201910983986.1, filed Oct. 16, 2019, the disclosure of which is incorporated herein by reference in its entirety.

BACKGROUND

The present disclosure relates generally to information handling systems, and more particularly to the storage of data via a network fabric.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often include storage systems for storing data, and current trends are providing for the connection to such storage systems via a network fabric to allow for the storage of data over the network fabric. For example, storage systems utilizing Non-Volatile Memory express (NVMe) Solid State Drives (SSDs) may be connected to computing devices (often referred to as host devices) via a network fabric to provide an NVMe over Fabric (NVMeoF) storage system that allows the host devices to store data. One common design architecture for network fabric NVMeoF storage systems is often referred to a NVMeoF Just a Bunch Of Flash (JBOF) design. The NVMe JBOF design may utilize redundant Link Control Cards (LCCs) that each provide a respective NVMeoF protocol processing system (e.g., provided via System On Chip (SOC) technologies) coupled to respective Peripheral Component Interconnect express (PCIe) switches, with those LCCs coupled through a midplane to the NVMe SSDs. Furthermore, the NVMe SSDs in the NVMeoF JBOF design typically include a plurality of memory devices (e.g., NAND flash memory devices) coupled to a processing system that provides PCIe/host interfaces, a translation layer (e.g., a Flash Translation Layer (FTL) for the NAND flash memory devices), and a controller (e.g., a NAND flash controller for the NAND flash memory devices), as well as a cache systems that may be provide by Dynamic Random Access Memory (DRAM) devices, Single Level Cell (SLC) flash memory devices, and/or other relatively high performance, robust memory device technologies known in the art.

In the conventional NVMeoF JBOF design discussed above, data may be received from host devices by the NVMeoF protocol processing system in the LCC and translated (e.g., from Ethernet protocol to PCIe protocol) and then provided to the PCIe switch, which then transmits that data to the NVMe SSD(s). As such, the data may be received by the PCIe/host interfaces in the processing system of the NVMe SSD and provided to the FTL in the NVMe SSD, which then processes that data for storage in the DRAM cache system and/or the NAND flash memory devices in the NVMe SSD. As will be appreciated by one of skill in the art, the FTL in the NVMe SSD may perform a variety of processing for that NVMe SSD, including data mapping (e.g., logical-address-to-physical-address (L2P) mapping of data stored on the NAND flash memory devices in the NVMe SSD), generation and storage of metadata associated with the lifecycle of that NVMe SSD, data recovery operations in the event data stored on that NVMe SSD is lost, movement of data between the NAND flash memory devices and the DRAM cache system, and/or a variety of other FTL operations known in the art. The inventor of the present disclosure has identified inefficiencies associated with conventional NVMeoF JBOF designs such as those described above.

For example, providing for the performance of FTL operations using a processing system in the NVMe SSD locks in FTL processing capabilities for that NVMe SSD, which limits the ability to optimize or customize FTL processing for different applications, introduces dependencies between the NVMe SSD controller and flash media support, and/or results in a variety of other FTL processing inefficiencies that would be apparent to one of skill in the art in possession of the present disclosure. Furthermore, providing dedicated cache systems on the NVMe SSDs increases the costs of those NVMe SSDs, locks in the cache system/NAND flash memory ratio for that NVMe SSD, can result in low cache system utilization (e.g., when that NVMe has low utilization), prevents flexibility in the use of different cache media types with that NVMe SSD, prevents cache system modification and/or adjustment (e.g., performance upgrades and/or downgrades depending on the use of the NVMe SSD), and/or results in a variety of other cache system inefficiencies that would be apparent to one of skill in the art in possession of the present disclosure.

Accordingly, it would be desirable to provide an improved network fabric storage system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a translation layer engine that is configured to: receive first data from at least one host device; process the first data for storage in at least one cache device that is coupled to the translation layer engine via a mid-plane and that is located in a storage/cache housing such that the first data is stored in the at least one cache device; determine that the first data should be stored in a first primary storage device that is included in a plurality of primary storage devices that are coupled to the translation layer engine via the mid-plane, that are each separate from the at least one cache device, and that are located in the storage/cache housing; and cause the first data to be moved from the at least one cache device to the first primary storage device such that the first data is stored in the first primary storage device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
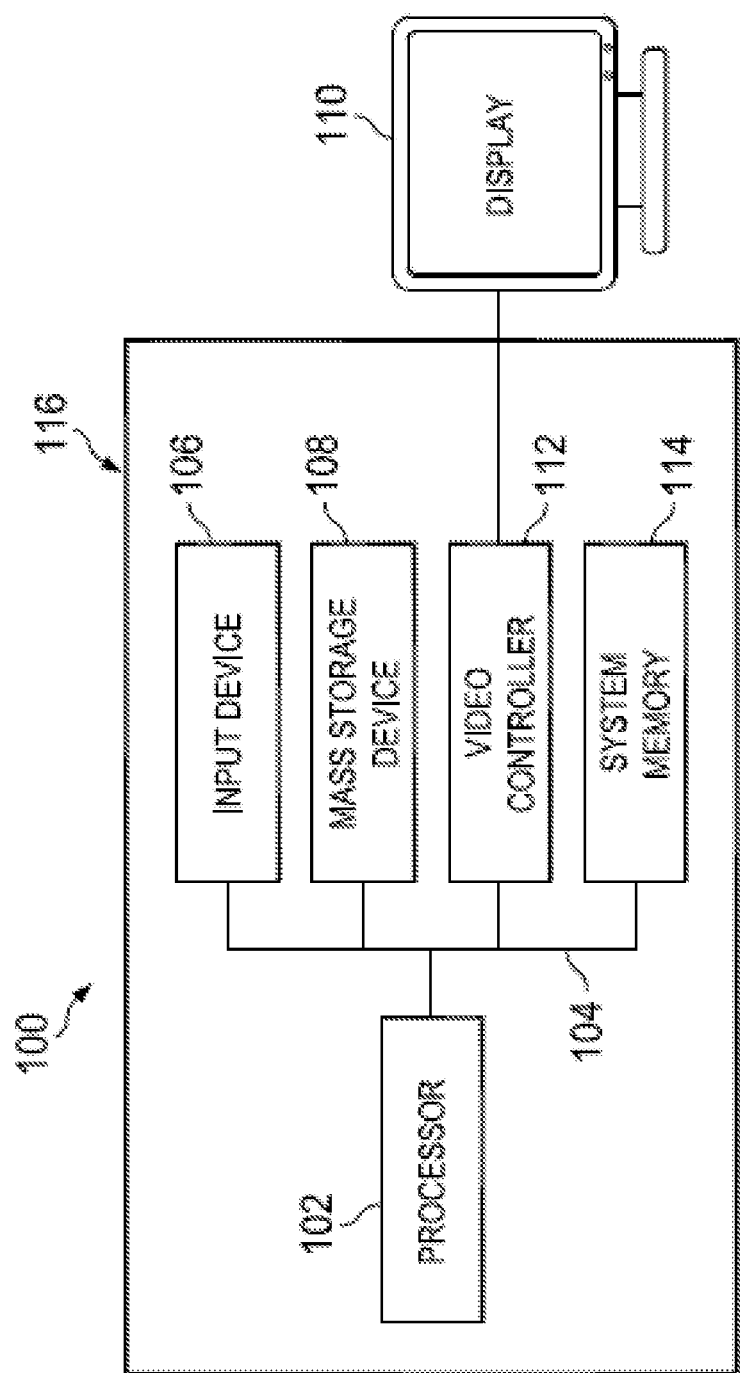
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
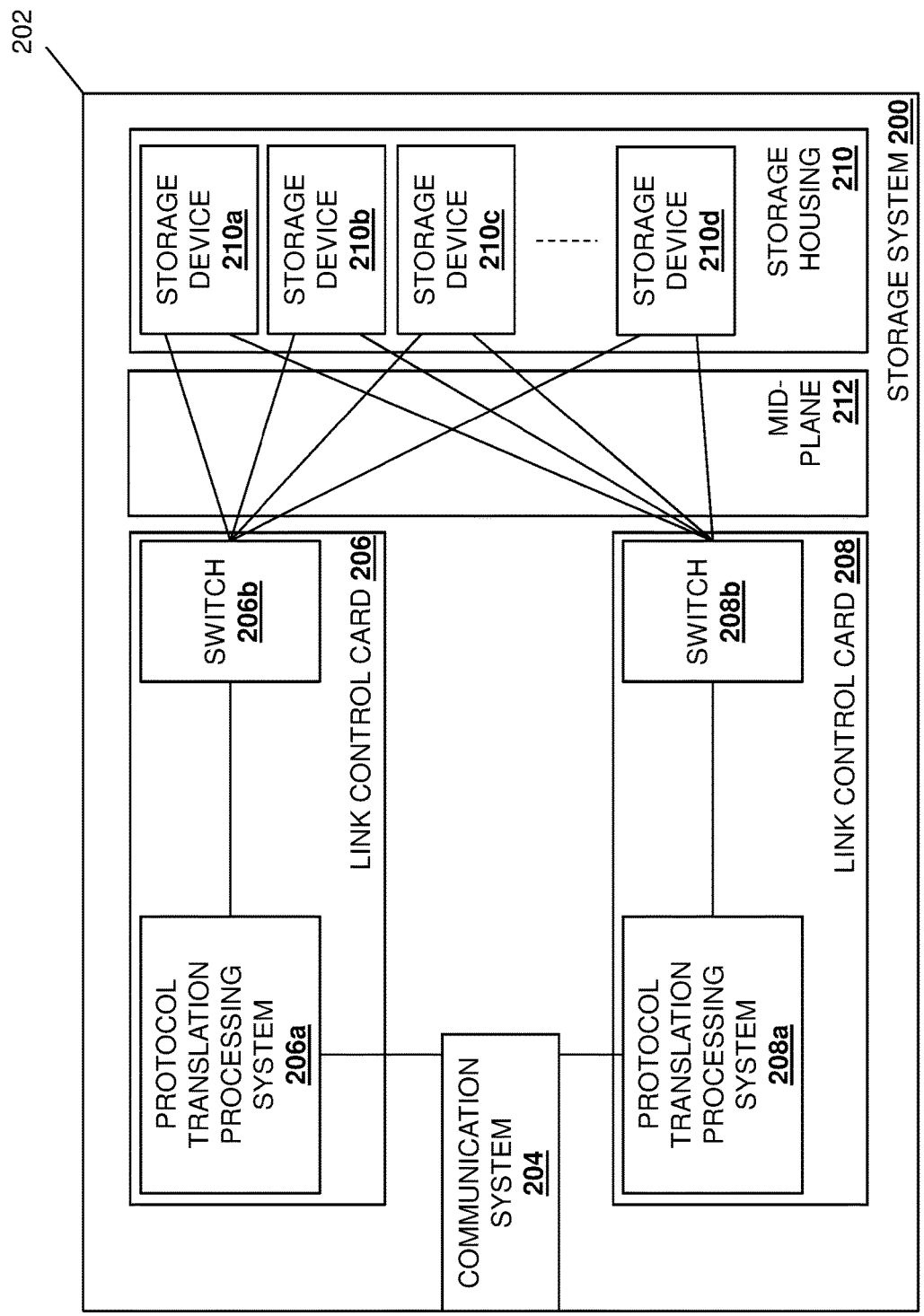
FIG. 2 is a schematic view illustrating an embodiment of a conventional network fabric storage system

Referring now to FIG. 2, an embodiment of a conventional network fabric storage system 200 is illustrated for the purposes of discussion below. The storage system 200 may be provided by the IHS 100 discussed above with reference to FIG. 1 and/or may include some or all of the components of the IHS 100. Furthermore, while illustrated and discussed as a storage system 200 provided within a single chassis/enclosure, one of skill in the art in possession of the present disclosure will recognize that the functionality of the storage system 200 and/or its components discussed below may be distributed across multiple chassis/enclosures while remaining within the scope of the present disclosure as well. In the illustrated embodiment, the storage system 200 includes a chassis 202 that houses the components of the storage system 200, only some of which are illustrated below. For example, the chassis 202 may house a communication system 204 that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. As such, the communication system 204 may include ports and/or other interfaces for coupling to the host device(s) (not illustrated) discussed below.

In the illustrated embodiment, the chassis 202 of the storage system 200 houses a pair of redundant Link Control Cards (LCCs) 206 and 208. For example, the LCC 206 may include a protocol translation processing system 206a that is coupled to the communication system 204, as well as to a switch 206b that is also included in the LCC 206. Similarly, the LCC 208 may include a protocol translation processing system 208a that is coupled to the communication system 204, as well as to a switch 208b that is also included in the LCC 208. In the examples below, the protocol translation processing systems 206a and 208a are provided via respective Non-Volatile Memory express on Fabric (NVMeoF) System On Chips (SOCs), while the switches 206b and 208b are provided by respective Peripheral Component Interconnect express (PCIe) switches. As will be appreciated by one of skill in the art in possession of the present disclosure, the NVMeoF SOCs that provides the protocol translation processing systems 206a and 208a may be configured to translate Ethernet, Fibre Channel, and/or other protocols utilized for data received from the host devices via the communication system 204 to a PCIe protocol utilized by components in the storage system 200, while the PCIe switches that provide the switches 206b and 208b may be configured to route data (translated to the PCIe protocol as discussed above). However, while some specific functionality of the components of the LCCs have been described, one of skill in the art in possession of the present disclosure will recognize that LCCs and/or LCC components may provide other conventional functionality while remaining within the scope of the present disclosure as well.

The chassis 202 of the storage system 200 also includes a storage housing 210 that houses a plurality of storage devices 210a, 210b, 210c, and up to 210d, each of which is coupled via a mid-plane 212 to each of the switches 206b and 208b in the LCCs 206 and 208, respectively. In the examples below, each of the storage devices 210a-210d are provided by conventional NVMe SSDs including dual ports that enable a dedicated coupling of each of those NVMe SSDs to each of the switches 206b and 208b (e.g., PCIe switches as discussed above) via the mid-plane 212. The functionality of mid-planes and other similar coupling subsystems are known in the art, and thus the coupling of the storage devices 210a-210d to the switches 206b and 208b will not be discussed herein in detail. While a specific conventional network fabric storage system 200 has been illustrated, one of skill in the art in possession of the present disclosure will recognize that conventional network fabric storage systems may include a variety of components and/or component configurations for providing conventional network fabric storage system functionality while remaining within the scope of the present disclosure as well.

Figure 3:
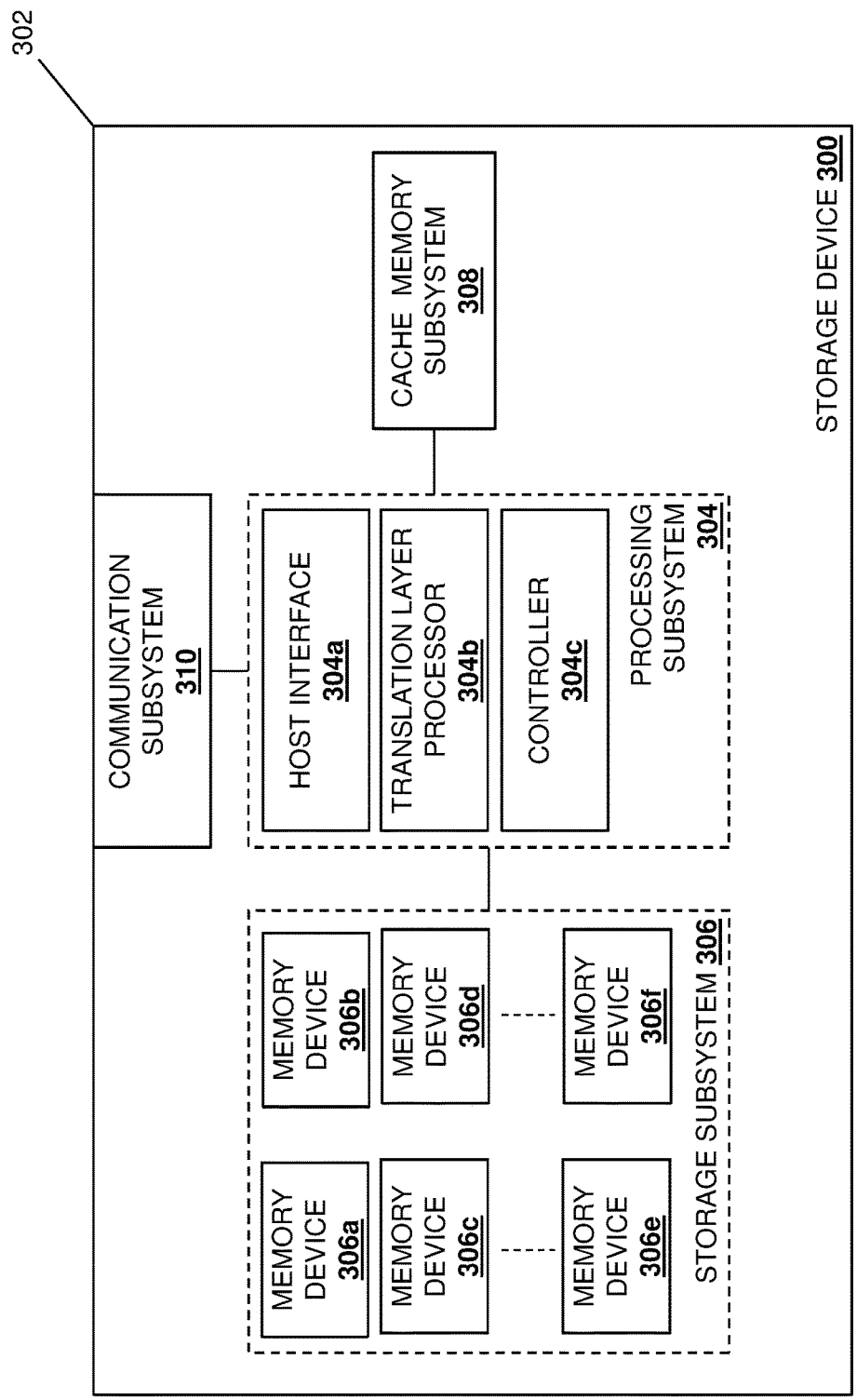
FIG. 3 is a schematic view illustrating an embodiment of a conventional storage device that may be included in the conventional network fabric storage system of FIG. 2.

Referring now to FIG. 3, an embodiment of a conventional storage device 300 is illustrated for the purposes of discussion below. The storage device 300 may be provided by the IHS 100 discussed above with reference to FIG. 1 and/or may include some or all of the components of the IHS 100. Furthermore, while illustrated and discussed as an NVMe SSD, one of skill in the art in possession of the present disclosure will recognize that the functionality of the storage device 300 and/or its components discussed below may be provided by a variety of storage device technologies while remaining within the scope of the present disclosure as well. In the illustrated embodiment, the storage device 300 includes a chassis 302 that houses the components of the storage device 300, only some of which are illustrated below. For example, the chassis 302 may house a processing subsystem 304 that, in the illustrated embodiment, includes a host interface 304a, a translation layer processor 304b, and a controller 304c. In the examples below, the host interface 304a is provided by PCIe and NVMe host interface(s) and is configured to receive data via the switches 206b and 208b (e.g., PCIe switches) in the LCCs 206 and 208, respectively. Furthermore, in the examples below, the translation layer processor 304b is provided by a Flash Translation Layer (FTL) processor that is configured to perform the data processing and storage device management functionality for the storage device 300 (e.g., for the NAND flash memory devices utilized by the storage device 300 as discussed below). Further still, in the examples below, the controller 304c is provided by a NAND flash controller that is configured to interact with the NAND flash memory devices utilized by the storage device 300 as discussed below. However, while specific components and functionality for the processing system 304 has been described, one of skill in the art in possession of the present disclosure will recognize that the processing system 304 may include other components and/or functionality while remaining within the scope of the present disclosure as well.

In the illustrated embodiment, the chassis 302 of the storage device 300 also houses a storage subsystem 306 that includes a plurality of memory devices 306a, 306b, 306c, 306d, and up to 306e and 306f. In the examples below, the memory devices 306a-306f are provided by NAND flash memory devices, although one of skill in the art in possession of the present disclosure will recognize that other memory device and/or storage technologies may be utilized for the storage subsystem 306 while remaining within the scope of the present disclosure as well. In the illustrated embodiment, the chassis 302 of the storage device 300 also houses a cache memory subsystem 308 that may be provided by one or more memory devices. In the examples below, the cache memory subsystem is provided by Dynamic Random Access Memory (DRAM) devices, although one of skill in the art in possession of the present disclosure will recognize that other memory device and/or storage technologies (e.g., Single Level Cell (SLC) flash memory devices, etc.) may be utilized for the cache memory subsystem 306 while remaining within the scope of the present disclosure as well. In the illustrated embodiment, the chassis 302 of the storage device 300 also houses a communication subsystem 310 that is coupled to the processing system 304 and configured to couple the processing system 304 to the mid-plane 212 in the storage system 200 and provide for communications with the LCCs 206 and 208 in the storage system. While a specific conventional storage device 300 has been illustrated, one of skill in the art in possession of the present disclosure will recognize that conventional storage devices may include a variety of components and/or component configurations for providing conventional storage device functionality while remaining within the scope of the present disclosure as well.

Figure 4:
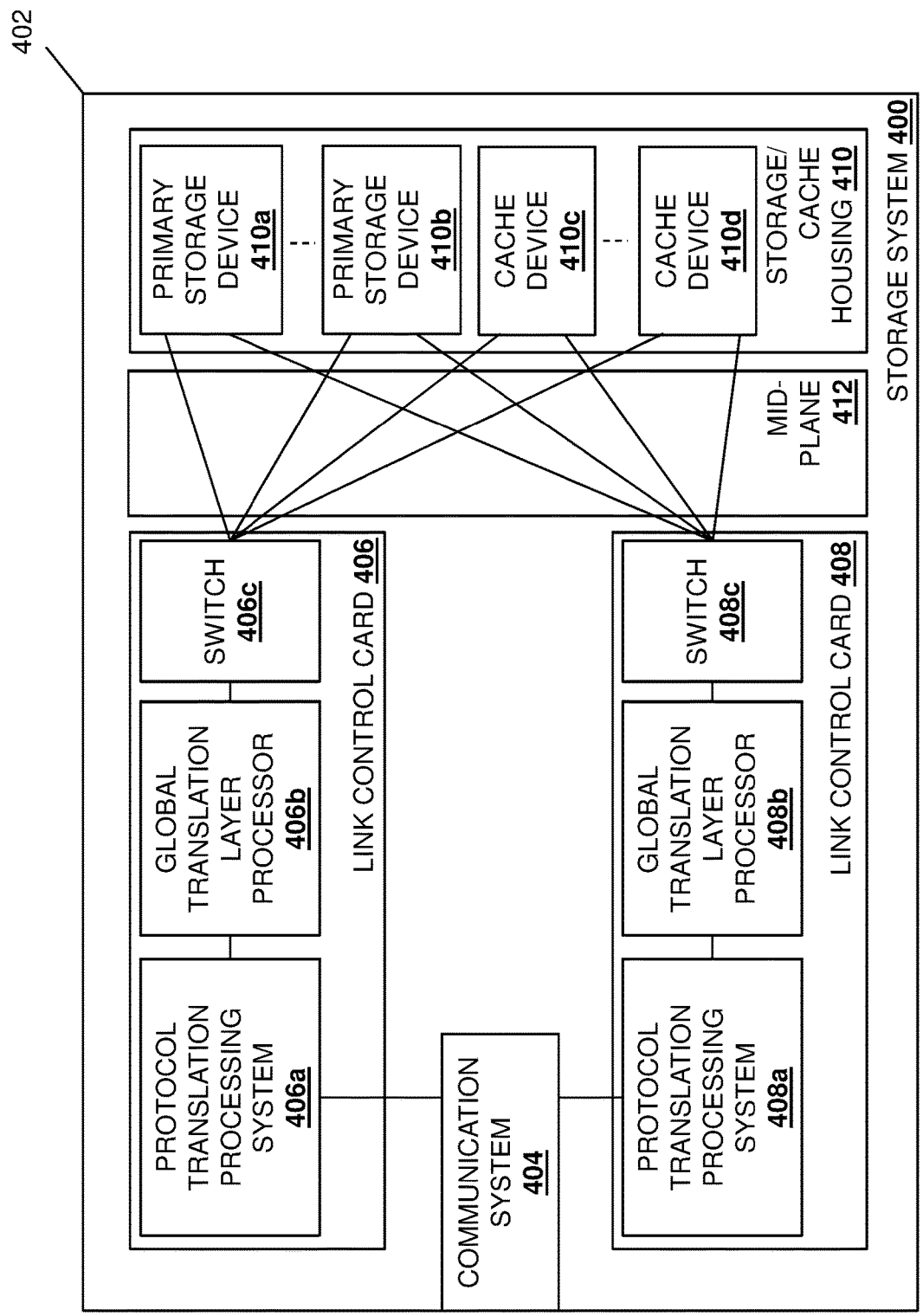
FIG. 4 is a schematic view illustrating an embodiment of a network fabric storage system provided according to the teachings of the present disclosure.

Referring now to FIG. 4, an embodiment of a network fabric storage system 400 provided according to the teachings of the present disclosure is illustrated. The storage system 400 may be provided by the IHS 100 discussed above with reference to FIG. 1 and/or may include some or all of the components of the IHS 100. Furthermore, while illustrated and discussed as a storage system 400 provided within a single chassis/enclosure, one of skill in the art in possession of the present disclosure will recognize that the functionality of the storage system 400 and/or its components discussed below may be distributed across multiple chassis/enclosures while remaining within the scope of the present disclosure as well. In the illustrated embodiment, the storage system 400 includes a chassis 402 that houses the components of the storage system 400, only some of which are illustrated below. For example, the chassis 402 may house a communication system 404 that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. As such, the communication system 404 may include ports and/or other interfaces for coupling to the host device(s) (not illustrated) discussed below.

In the illustrated embodiment, the chassis 402 of the storage system 400 houses a pair of redundant Link Control Cards (LCCs) 406 and 408. For example, the LCC 406 may include a protocol translation processing system 206a that is coupled to the communication system 204 as well as to a global translation layer processor 406b that is also included in the LCC 206, with the global translation layer processor 406b coupled to a switch 406c that is also included in the LCC 406. Similarly, the LCC 408 may include a protocol translation processing system 208a that is coupled to the communication system 204 as well as to a global translation layer processor 408b that is also included in the LCC 208, with the global translation layer processor 408b coupled to a switch 408c that is also included in the LCC 408. In the examples below, the protocol translation processing systems 406a and 408a are provided via respective Non-Volatile Memory express on Fabric (NVMeoF) System On Chips (SOCs), the global translation layer processors 406b and 408*b* are provided by respective Flash Translation Layer (FTL) processors, while the switches 406*c* and 408*c* are provided by respective Peripheral Component Interconnect express (PCIe) switches.

As will be appreciated by one of skill in the art in possession of the present disclosure, the NVMeoF SOCs that provide the protocol translation processing systems 406*a* and 408*a* may be configured to translate Ethernet, Fibre Channel, and/or other protocols utilized for data received from host devices via the communication system 404 to a PCIe protocol utilized by components in the storage system 400, while the FTL processors that provides the global translation layer processors 406 and 408*b* may be configured to perform the data processing and storage device management functionality for any of the primary storage devices and cache devices provided in the storage system 400, and the PCIe switches that provides the switches 406*c* and 408*c* may be configured to route data (translated to the PCIe protocol as discussed above). However, while some specific functionality of the components of the LCCs have been described, one of skill in the art in possession of the present disclosure will recognize that LCCs and/or LCC components may provide other conventional functionality while remaining within the scope of the present disclosure as well.

The chassis 402 of the storage system 400 also includes a storage/cache housing 410 that houses a plurality of primary storage devices 410*a* and up to 410*b*, each of which is coupled via a mid-plane 412 to each of the switches 406*c* and 408*c* in the LCCs 406 and 408, respectively. As illustrated, the storage/cache housing 410 may also house a plurality of cache devices 410*c* and up to 410*d*, each of which is separate from any of the primary storage devices 410*a*-410*b* (e.g., provided by a different drive, device, chassis, etc. than is used to provide the primary storage devices 410*a*-410*b*), and each of which is coupled via a mid-plane 412 to each of the switches 406*c* and 408*c* in the LCCs 406 and 408, respectively. In the examples below, each of the primary storage devices 410*a*-410*b* are provided by the NVMe SSDs described below that include dual ports that enable a dedicated coupling (e.g., via a dedicated PCIe connection) of each of those NVMe SSDs to each of the switches 406*b* and 408*b* (e.g., PCIe switches as discussed above) via the mid-plane 412.

Furthermore, in the examples below, each of the cache devices 410*c*-410*d* are provided by DRAM memory systems that include dual ports that enable a dedicated coupling (e.g., via a dedicated PCIe connection) of each of those DRAM memory systems to each of the switches 406*b* and 408*b* (e.g., PCIe switches as discussed above) via the mid-plane 412. However, one of skill in the art in possession of the present disclosure will recognize that the DRAM memory systems that provide the cache devices 410*c*-410*d* may be replaced by SLC flash memory systems, 3D XPoint memory systems, and/or other cache memory system technologies known in the art. Furthermore, while more than one of the cache devices 410*c*-410*d* is illustrated, one of skill in the art in possession of the present disclosure will recognize that the storage system 400 may utilize a single cache device while remaining within the scope of the present disclosure as well. As discussed below, in some embodiments, the cache devices 410*c*-410*d* may utilize relatively higher performance and higher endurance storage technologies than the primary storage devices 410*a*/410*b* due to, for example, the tendency to perform many more write operations to storage devices providing a cache. While a specific network fabric storage system 200 has been illustrated, one of skill in the art in possession of the present disclosure will recognize that network fabric storage system of the present disclosure may include a variety of components and/or component configurations for providing conventional network fabric storage system functionality, as well as the functionality described below, while remaining within the scope of the present disclosure as well.

Figure 5:
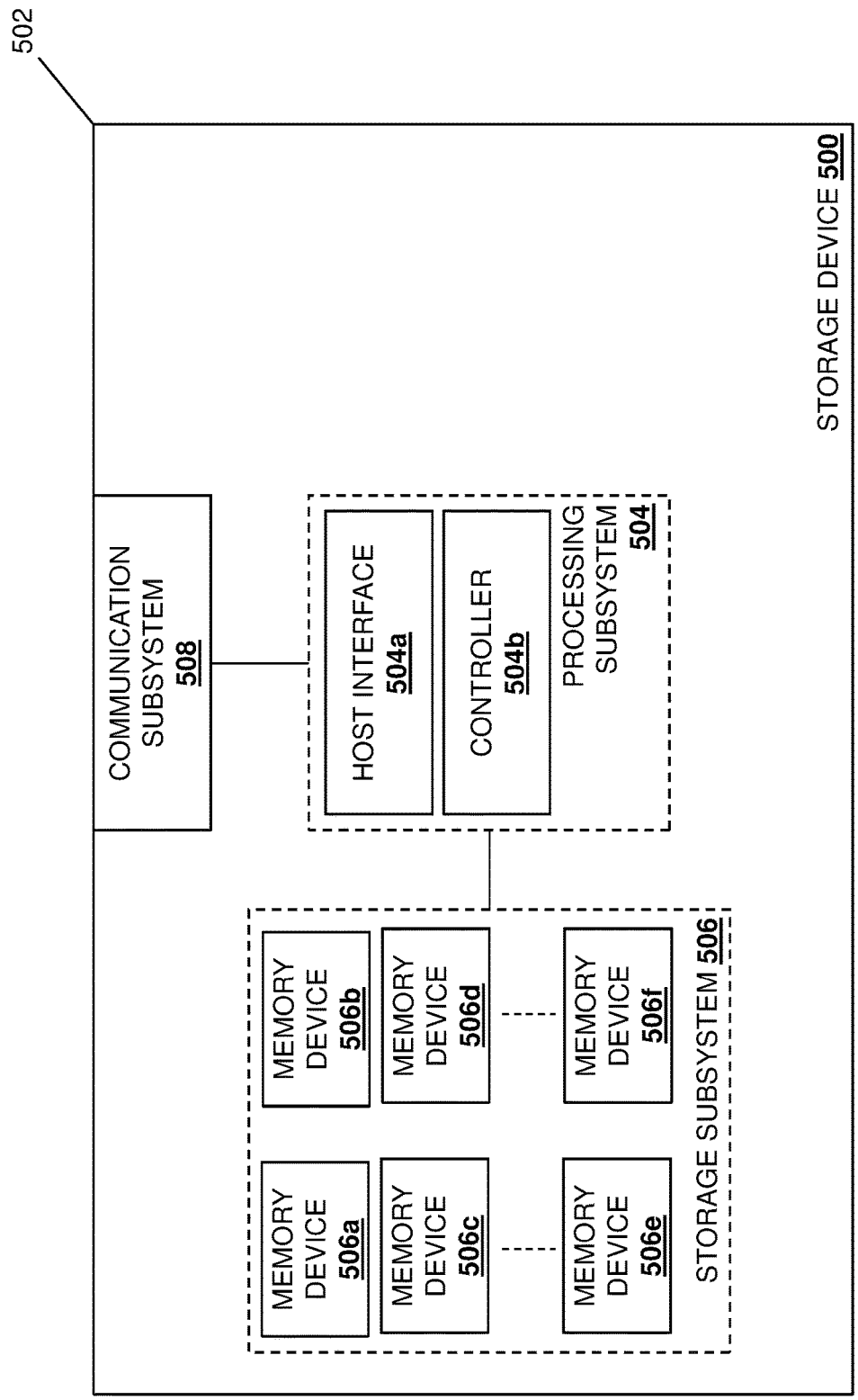
FIG. 5 is a schematic view illustrating an embodiment of a storage device provided according to the teachings of the present disclosure that may be included in the network fabric storage system of FIG. 4.

Referring now to FIG. 5, an embodiment of a storage device 500 provided according to the teachings of the present disclosure is illustrated. The storage device 500 may be provided by the IHS 100 discussed above with reference to FIG. 1 and/or may include some or all of the components of the IHS 100. Furthermore, while illustrated and discussed as an NVMe SSD, one of skill in the art in possession of the present disclosure will recognize that the functionality of the storage device 500 and/or its components discussed below may be provided by a variety of storage device technologies while remaining within the scope of the present disclosure as well. In the illustrated embodiment, the storage device 500 includes a chassis 502 that houses the components of the storage device 500, only some of which are illustrated below. For example, the chassis 502 may house a processing subsystem 304 that, in the illustrated embodiment, includes a host interface 504*a* and a controller 504*b*, and that is free of a translation layer processor like the translation layer processor 304*b* (e.g., the FTL processor discussed above) that is included in the conventional storage device 300 discussed above with reference to FIG. 3. In the examples below, the host interface 504*a* is provided by PCIe and NVMe host interface(s) and is configured to receive data via the switches 406*c* and 408*c* (e.g., PCIe switches) in the LCCs 406 and 408, respectively. Furthermore, in the examples below, the controller 504*b* is provided by a NAND flash controller that is configured to interact with the NAND flash memory devices utilized by the storage device 500 as discussed below. However, while specific components and functionality for the processing system 504 has been described, one of skill in the art in possession of the present disclosure will recognize that the processing system 504 may include other components and/or functionality while remaining within the scope of the present disclosure as well.

In the illustrated embodiment, the chassis 502 of the storage device 500 also houses a storage subsystem 506 that includes a plurality of memory devices 506*a*, 506*b*, 506*c*, 506*d*, and up to 506*e* and 506*f*. In the examples below, the memory devices 506*a*-506*f* are provided by NAND flash memory devices, although one of skill in the art in possession of the present disclosure will recognize that other memory device and/or storage technologies may be utilized for the storage subsystem 506 while remaining within the scope of the present disclosure as well. In the illustrated embodiment, the storage device 500 is free of a cache memory subsystem like the cache memory subsystem 308 (e.g., the DRAM devices discussed above) that is included in the conventional storage device 300 discussed above with reference to FIG. 3. In the illustrated embodiment, the chassis 502 of the storage device 500 also houses a communication subsystem 510 that is coupled to the processing system 504 and configured to couple the processing system 504 to the mid-plane 412 in the storage system 400 and provide for communications with the LCCs 406 and 408 in the storage system. While a specific storage device 500 has been illustrated, one of skill in the art in possession of the present disclosure will recognize that storage devices provided according to the teachings of the present disclosure may include a variety of components and/or component configurations for providing conventional storage device functionality, as well as the functionality discussed below, while remaining within the scope of the present disclosure as well.

Figure 6:
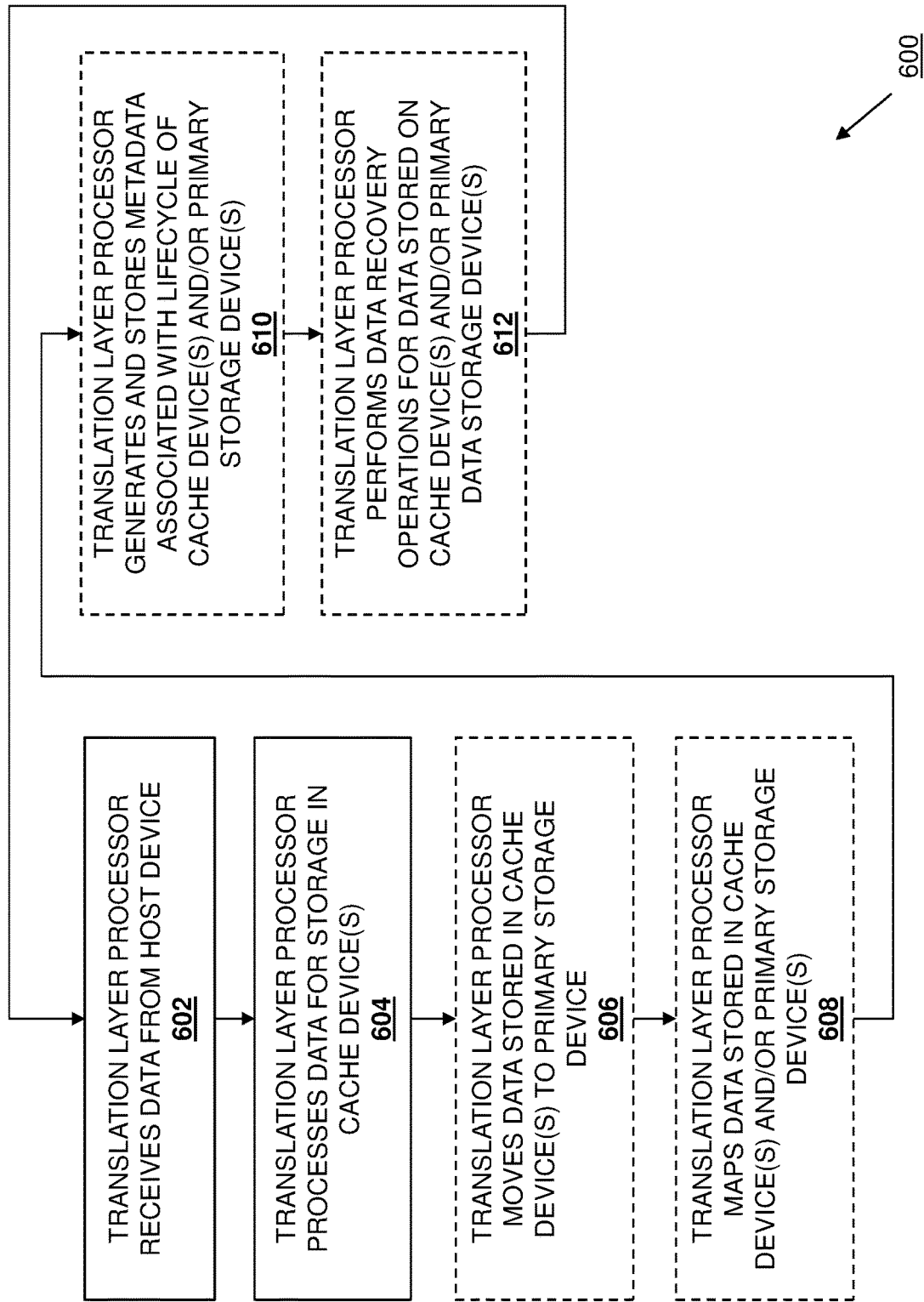
FIG. 6 is a flow chart illustrating an embodiment of a method for storing data in a network fabric storage system.

Referring now to FIG. 6, an embodiment of a method 400 for storing data in a network fabric storage system is illustrated. As discussed below, the systems and methods of the present disclosure provide a new architecture for network fabric storage systems that moves the translation layer processing from individual storage devices to Link Control Cards (LCCs) in order to provide for global translation layer processing for each of the storage devices in the storage system, while removing cache subsystems from the individual storage devices and providing a centralized cache system utilized by all of the storage devices. For example, the storage system may include a storage/cache housing that houses a plurality of primary storage devices and at least one cache device that is separate from each of the plurality of primary storage devices. A mid-plane in the storage system couples the plurality of primary storage devices and the at least one cache device to a Link Control Card (LCC), and the LCC includes a translation layer processor that receives data from a host device, and processes the data for storage in the at least one cache device such that the data is stored in the at least one cache device. When the translation layer processor determines that the data should be stored in a first primary storage device included in the plurality of primary storage devices, it causes the data to be moved from the at least one cache device to the first primary storage device such that the first data is stored in the first primary storage device.

As such, the new network fabric storage system architecture described herein moves from the individualized translation layer processing provided in conventional storage devices to global translation layer processors to provide the ability to optimize or customize the translation layer processing for different applications, reduce the dependencies between the storage device controllers and storage media support, reduce the cost of the storage device (e.g., by eliminating dedicated chipsets provided for dedicated translation layer processing), and provide other translation layer processing efficiencies that would be apparent to one of skill in the art in possession of the present disclosure. Furthermore, the new network fabric storage system architecture described herein eliminates the dedicated cache systems on its storage devices to decrease the costs of those storage devices, provides the ability to adjust the cache/primary storage ratio for the storage system, results in higher cache system utilization, introduces flexibility in the use of different cache media types with storage devices, enables cache system modification and/or adjustment (e.g., performance upgrades and/or downgrades depending on the use of the storage system), and/or provides a variety of other cache system efficiencies that would be apparent to one of skill in the art in possession of the present disclosure.

With reference to the conventional network fabric storage system 200 illustrated in FIG. 2 and the conventional storage device 300 illustrated in FIG. 3, conventional network fabric storage system operations are discussed briefly for reference below. With initial reference to FIG. 2, a host device (not illustrated) may transmit data to the communication system 204 for storage in the storage system 200. As such, the protocol translation processing system 206*a* in the LCC 206 may receive that data from the communication system 204, perform protocol translation operations on that data to produce translated data (e.g., by translating the data from an Ethernet protocol to a PCIe protocol), and may provide the translated data to the switch 206, which may route that data to one or more of the storage devices 210*a*-210*d*. As will be appreciated by one of skill in the art in possession of the present disclosure, data may be received and provided to one or more of the storage devices 210*a*-210*d* via the protocol translation processing system 208*a* and the switch 208*b* in the LCC 208 in a similar manner as well.

With reference to FIG. 3, the host interface 304*a* in the processing subsystem 304 of the storage device 300 that receives the data may then provide that data to the translation layer processor 304*b* in the processing subsystem 304, which may process that data for storage in the storage subsystem 306 or the cache memory subsystem 308, and may provide that data to the controller 304*c* along with instructions to store that data as determined by its processing. The controller 304*c* in the processing subsystem 304 may then receive that data from the translation layer processor 304*b* and may store that data in one or more of the memory devices 306*a*-306*f* in the storage subsystem 306, or in the cache memory subsystem 308, depending on the instructions provided by the translation layer processor 304*b*. As such, in some examples, the controller 304*c* may store the data in the cache memory subsystem 308. As will be appreciated by one of skill in the art in possession of the present disclosure, the translation layer processor 304*b* may subsequently determine that the data that was stored in the cache memory subsystem 308 should be moved from the cache memory subsystem 308 to the storage subsystem 306, and may provide an instruction to the controller 304*c* that causes the controller to move the data from the cache memory subsystem 308 to one or more of the memory devices 306*a*-306*f* in the storage subsystem 306.

As such, the translation layer processor 304*b* may operate to control the storage of any data provided to the storage device 300 in the cache memory subsystem 308 or the storage subsystem 306, as well as the movement of data between the cache memory subsystem 308 or the storage subsystem 306. Furthermore, the translation layer processor 304*b* may operate to perform mapping operations (e.g., logical-address-to-physical-address mapping operations) on data stored in the storage device 300, generate and store metadata about the lifecycle of the storage device 300 (e.g., information about a number of writes to the storage devices), enforce policies for the storage device 300 (e.g., to extend the life of the storage device or increase its performance), perform data recovery operations when data on the storage device 300 becomes unavailable, and/or perform a variety of other translation layer processor functionality known in the art.

As discussed above, providing for the performance of translation layer processing operations using the processing subsystem 304 in the storage device 300 locks in translation layer processing capabilities for the storage device 300, which limits the ability to optimize or customize translation layer processing for different applications, introduces dependencies between the processing subsystem 304 and flash media support, and results in a variety of other translation layer processing inefficiencies that would be apparent to one of skill in the art in possession of the present disclosure. Furthermore, providing the dedicated cache memory subsystem 308 on the storage device 300 increases the costs of the storage device 300, locks in the cache subsystem/storage subsystem 306 ratio for the storage device 300, can result in relatively low utilization of the cache memory subsystem 308 (e.g., when the storage device 300 has low utilization), prevents flexibility in the use of different cache media types with the storage device 300, prevents modification of the cache memory subsystem 308 and/or adjustment (e.g., performance upgrades and/or downgrades depending on the use of the storage device 300), and/or results in a variety of other cache memory subsystem inefficiencies that would be apparent to one of skill in the art in possession of the present disclosure.

The method 600 begins at block 602 where a translation layer processor receives data from a host device. In an embodiment, at block 602, a host device coupled to the storage system 400 may generate data for storage in the storage system 400 and transmit that data to the communication system 404. As such, at block 602, the protocol translation processing system 406a in the LLC 406 may receive that data from the communication system 404, perform protocol translation operations on that data to provide translated data (e.g., by translating the data from an Ethernet protocol or Fibre Channel (FC) protocol to a PCIe protocol), and provide the translated data to the global translation layer processor 406b. Thus, at block 602, the global translation layer processor 406b may receive the translated data from the protocol translation processing system 406a. As will be appreciated by one of skill in the art in possession of the present disclosure, the global translation layer processor 408b may receive data transmitted by a host device in a similar manner (e.g., via the communication system 404 and the protocol translation processing system 408b). In some examples, data received from host devices may be load balanced between the LCCs 406 and 408 to reduce the processing load on the global translation layer processors 406b and 408b.

The method 600 then proceeds to block 604 where the translation layer processor processes the data for storage in one or more cache devices. In an embodiment, at block 604, the global translation layer processor 406b may operate to process the data received at block 602 for storage in the primary storage devices 410a-410b or the cache devices 410c-410d, and may provide that data via the switch 406c along with instructions to store that data as determined by its processing. As such, in this example, at block 604 the global translation layer processor 406b may process the data received at block 602 and determine that that data should be stored in the cache device 410c, and may provide that data to the cache device 410c via the switch 406c along with instructions to store that data in that cache device 410c. The switch device 406c may then transmit that data to the cache device 410c. As such, at block 604, the cache device 410c may receive the data and store it in its memory system (e.g., the DRAM devices, SLC flash devices, and/or 3D XPoint memory devices discussed above).

The method 600 may then proceed to optional block 606 where the translation layer processor may move data stored in the one or more cache devices to one or more primary storage devices. In an embodiment, at block 606, the global translation layer processor 406b may operate to determine that the data stored in the cache device 410c at block 604 should be moved to a primary storage device. For example, the global translation layer processor 406b may determine that the data storage in the cache device 410c should be moved to the primary storage device 410a, retrieve that data from the cache device 410c via the switch 406c, and provide that data to the primary storage device 410a via the switch 406c along with instructions to store that data in that primary storage device 410a. The switch device 406c may then transmit that data to the primary storage device 410a. As such, at block 604, the host interface 504a in the processing system 504 included in the storage device 500 may receive the data and instructions via the communication subsystem 508 and provide them to the controller 504b in the processing subsystem 504, which may then execute the instructions and store the data in one or more of the memory devices 506a-506f in the storage subsystem 506. Thus, one of skill in the art in possession of the present disclosure will appreciate how the global translation layer processor 406b (or the global translation layer processor 408b) may receive data from host device(s), store that data in either primary storage device(s) 410a-410b or cache device(s) 410c-410d, move data between primary storage device(s) 410a-410b or cache device(s) 410c-410d, and/or perform any of a variety of data storage and/or data movement operations that would be apparent to one of skill in the art in possession of the present disclosure.

The method 600 may then proceed to optional block 608 where the translation layer processor may map data stored in the one or more cache devices to the one or more primary storage devices. In an embodiment, at block 608, the global translation layer processor 406b may operate to map data stored in the primary storage device(s) 410a-410b and/or the cache devices 410c-410d. For example, the global translation layer processor 406b may operate to perform mapping operations (e.g., logical-address-to-physical-address mapping operations) for any data that it provides for storage in any of the primary storage device(s) 410a-410b and/or the cache devices 410c-410d to produce mapping operations that map the physical location of that data subsequent to its storage to the logical location utilized to retrieve that data, and store associated mapping information in a storage subsystem that is accessible to the global translation layer processor 406b. As such, one of skill in the art in possession of the present disclosure will appreciate how the global translation layer processor 406b (or the global translation layer processor 408b) may map data that is stored in in either primary storage device(s) 410a-410b or cache device(s) 410c-410d, and/or perform any of a variety of data mapping operations that would be apparent to one of skill in the art in possession of the present disclosure.

The method 600 may then proceed to optional block 610 where the translation layer processor may generate and store metadata associated with the lifecycle of the one or more cache devices and/or the one or more primary storage devices. In an embodiment, at block 610, the global translation layer processor 406b may operate to generate and store metadata associated with a lifecycle of any of the primary storage devices 410a-410c and/or any of the cache devices 410c-410d. For example, the global translation layer processor 406b may operate to monitor any lifecycle characteristics for each of the primary storage devices 410a-410c and the cache devices 410c-410d (e.g., a number of writes to that storage device), generate metadata associated with those lifecycle characteristics, and store that metadata in a storage subsystem that is accessible to the global translation layer processor 406b. As such, one of skill in the art in possession of the present disclosure will appreciate how the global translation layer processor 406b (or the global translation layer processor 408b) may generate and store lifecycle metadata for any of the storage devices in the storage/cache housing 410, and/or perform any of a variety of metadata/lifecycle operations that would be apparent to one of skill in the art in possession of the present disclosure. Furthermore, in some embodiments, metadata operations may include the enforcement of storage device policies defined via metadata in order to, for example, extend the life of the storage device 400 and/or its components and/or provide for maximum performance of the storage device 400 and/or its components, and/or perform a variety of other storage device policy operations that would be apparent to one of skill in the art in possession of the present disclosure.

The method 600 may then proceed to optional block 612 where the translation layer processor may perform data recovery operations for data stored on the one or more cache devices and/or the one or more primary storage devices. In an embodiment, at block 612, the global translation layer processor 406b may operate to perform data recovery operations for any of the primary storage devices 410a-410c and/or any of the cache devices 410c-410d. For example, the global translation layer processor 406b may operate to determine that data that was stored on any of the primary storage devices 410a-410c and/or the cache devices 410c-410d has become lost, corrupted, and/or otherwise unavailable and, in response, may perform data recovery operations. As such, one of skill in the art in possession of the present disclosure will appreciate how the global translation layer processor 406b (or the global translation layer processor 408b) may operate to recover data that has become unavailable the primary storage devices 410a-410c and/or the cache devices 410c-410d, and/or perform any of a variety of data recovery operations that would be apparent to one of skill in the art in possession of the present disclosure.

The method 600 may then return to block 602, and may loop through blocks 602-612 to continue to perform the operations described above. As such, the global translation layer processor(s) of the present disclosure may perform the data storage operations, data movement operations, data mapping operations, metadata generation and storage operations, policy enforcement operations, and data recovery operations discussed above, as well as any other translation layer processing for the primary storage devices 410a-410c and/or cache devices 410c-410d during the method 600.

Thus, systems and methods have been described that provide a new architecture for NVMeoF systems that moves the FTL processing from individual NVMe SSDs to LCCs in order to provide for global FTL processing for each of the NVMe SSDs in the NVMeoF system, while removing DRAM cache subsystems from the individual NVMe SSDs and providing a centralized cache system utilized by all of the NVMe SSDs. For example, the NVMeoF systems may include a storage/cache housing that houses a plurality of NVMe SSDs and at least one DRAM cache device that is separate from each of the plurality of NVMe SSDs. A mid-plane in the NVMeoF system couples the plurality of NVMe SSDs and the at least one DRAM cache device to an LCC, and the LCC includes an FTL processor that receives data from a host device, and processes the data for storage in the at least one DRAM cache device such that the data is stored in the at least one DRAM cache device. When the FTL processor determines that the data should be stored in an NVMe SSD, it causes the data to be moved from the at least one DRAM cache device to the NVMe SSD such that the data is stored in the NVMe SSD.

As such, the new NVMeoF system architecture described herein moves from the individualized FTL processing provided in conventional NVMe SSDs to global FTL processing to provide the ability to optimize or customize the FTL processing for different applications, reduce the dependencies between the NVMe SSD controllers and storage media support, eliminate the dedicated chipset utilized to provide on-storage-device FTL processing, and provide other FTL processing efficiencies that would be apparent to one of skill in the art in possession of the present disclosure. Furthermore, the new NVMeoF system architecture described herein eliminates the dedicated DRAM cache systems on its NVMe SSDs to decrease the costs of those NVMe SSDs, provides the ability to adjust the DRAM cache/NAND flash memory ratio for the NVMeoF system, results in higher DRAM cache system utilization, introduces flexibility in the use of different cache media types with NVMe SSDs other than DRAM (e.g., SLC, 3D XPoint, etc.), enables DRAM cache system modification and/or adjustment (e.g., performance upgrades and/or downgrades depending on the use of the NVMeoF system), and/or provides a variety of other DRAM cache system efficiencies that would be apparent to one of skill in the art in possession of the present disclosure Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A network fabric storage system, comprising:
  a system chassis;
  a plurality of primary flash-based storage devices that are housed in the system chassis and that each include a respective primary flash-based storage device chassis that does not house a Flash Translation Layer (FTL) processor;
  at least one cache device that is housed in the system chassis and that is not housed in the respective primary flash-based storage device chassis included on any of the plurality of primary flash-based storage devices;
  a mid-plane that is housed in the system chassis; and
  a Link Control Card (LCC) that is housed in the system chassis and coupled to each of the plurality of primary flash-based storage devices and the at least one cache device via the mid-plane, wherein the LCC includes an FLT processor that is configured to:
    receive first data from at least one host device;
    process the first data for storage in the at least one cache device such that the first data is transmitted via the mid-plane and stored in the at least one cache device;
    determine that the first data should be stored in a first primary flash-based storage device included in the plurality of primary flash-based storage devices; and
    cause, via the mid-plane, the first data to be moved from the at least one cache device to the first primary flash-based storage device such that the first data is stored in the first primary flash-based storage device.

2. The system of claim 1, wherein the FTL processor is configured to:
  perform logical-address-to-physical-address mapping operations for the first data stored on the at least one cache device; and
  perform logical-address-to-physical-address mapping operations for the first data stored on the first primary flash-based storage device.

3. The system of claim 1, wherein the FTL processor is configured to:
  generate and store metadata associated with a lifecycle of each of the plurality of primary flash-based storage devices.

4. The system of claim 1, wherein the FTL processor is configured to:
  determine that the first data that was stored on the first primary flash-based storage device is unavailable and, in response, perform data recovery operations for the data that was stored on the first primary flash-based storage device.

5. The system of claim 1, wherein each of the plurality of primary flash-based storage devices are provided by a Non-Volatile Memory express (NVMe) Solid State Drive (SSD).

6. The system of claim 1, wherein the FTL processor is configured to:
receive second data from the host device;
process the second data for storage in the at least one cache device such that the second data is transmitted via the mid-plane and stored in the at least one cache device;
determine that the second data should be stored in a second primary flash-based storage device included in the plurality of primary flash-based storage devices; and
cause, via the mid-plane, the second data to be moved from the at least one cache device to the second primary flash-based storage device such that the second data is stored in the second primary flash-based storage device.

7. The system of claim 1, wherein the respective primary flash-based storage device chassis included on each of the plurality of primary flash-based storage devices does not house a cache subsystem.

8. The IHS of claim 7, wherein the FTL engine is configured to:
perform logical-address-to-physical-address mapping operations for the first data stored on the at least one cache device; and
perform logical-address-to-physical-address mapping operations for the first data stored on the first primary flash-based storage device.

9. The IHS of claim 7, wherein the FTL engine is configured to:
generate and store metadata associated with a lifecycle of each of the plurality of primary flash-based storage devices.

10. The IHS of claim 7, wherein the FTL engine is configured to:
determine that the first data that was stored on the first primary flash-based storage device is unavailable and, in response, perform data recovery operations for the data that was stored on the first primary flash-based storage device.

11. The IHS of claim 7, wherein each of the plurality of primary flash-based storage device are provided by a Non-Volatile Memory express (NVMe) Solid State Drive (SSD).

12. The IHS of claim 7, wherein the FTL engine is configured to:
receive second data from the host device;
process the second data for storage in the at least one cache device such that the second data is transmitted via the mid-plane and stored in the at least one cache device;
determine that the second data should be stored in a second primary flash-based storage device included in the plurality of primary flash-based storage devices; and
cause, via the mid-plane, the second data to be moved from the at least one cache device to the second primary flash-based storage device such that the second data is stored in the second primary flash-based storage device.

13. An Information Handling System (IHS), comprising:
a processing system; and
a memory system that is coupled to the processing system, and that includes instructions that, when executed by the processing system, cause the processing system to provide a Flash Translation Layer (FTL) engine that is configured to:
receive first data from at least one host device;
process the first data for storage in at least one cache device that is coupled to the FTL engine via a mid-plane and that is located in a storage/cache housing such that the first data is transmitted via the mid-plane and stored in the at least one cache device;
determine that the first data should be stored in a first primary flash-based storage device that is included in a plurality of primary flash-based storage devices that are coupled to the FTL engine via the mid-plane, that each include a respective primary flash-based storage device chassis that does not house a Flash Translation Layer (FTL) processor, that are each separate from or the at least one cache device, and that are located in the storage/cache housing; and
cause, via the mid-plane, the first data to be moved from the at least one cache device to the first primary flash-based storage device such that the first data is stored in the first primary flash-based storage device.

14. A method storing data in a network fabric storage system, comprising:
receiving, by a Flash Translation Layer (FTL) processor, first data from at least one host device;
processing, by the FTL processor, the first data for storage in at least one cache device that is coupled to the FTL processor via a mid-plane and that is located in a storage/cache housing such that the first data is transmitted via the mid-plane and stored in the at least one cache device;
determining, by the FTL processor, that the first data should be stored in a first primary flash-based storage device that is included in a plurality of primary flash-based storage devices that are coupled to the FTL engine via the mid-plane, that each include a respective primary flash-based storage device chassis that does not house a Flash Translation Layer (FTL) processor or the at least one cache device, and that are located in the storage/cache housing; and
causing, by the FTL processor via the mid-plane, the first data to be moved from the at least one cache device to the first primary flash-based storage device such that the first data is stored in the first primary flash-based storage device.

15. The method of claim 14, further comprising:
performing, by the FTL processor, logical-address-to-physical-address mapping operations for the first data stored on the at least one cache device; and
performing, by the FTL processor, logical-address-to-physical-address mapping operations for the first data stored on the first primary flash-based storage device.

16. The method of claim 14, further comprising:
generating and storing, by the FTL processor, metadata associated with a lifecycle of each of the plurality of primary flash-based storage devices.

17. The method of claim 14, further comprising:
determining, by the FTL processor, that the first data that was stored on the first primary flash-based storage device is unavailable and, in response, performing data recovery operations for the data that was stored on the first primary flash-based storage device.

18. The method of claim 14, wherein each of the plurality of primary flash-based storage are provided by a Non-Volatile Memory express (NVMe) Solid State Drive (SSD).

19. The method of claim 14, further comprising:
receiving, by the FTL processor, second data from the host device;
processing, by the FTL processor, the second data for storage in the at least one cache device such that the second data is transmitted via the mid-plane and stored in the at least one cache device;
determining, by the FTL processor, that the second data should be stored in a second primary flash-based storage device included in the plurality of primary flash-based storage devices; and
causing, by the FTL processor via the mid-plane, the second data to be moved from the at least one cache device to the second primary flash-based storage device such that the second data is stored in the second primary flash-based storage device.

20. The method of claim 14, wherein the respective primary flash-based storage device chassis included on each of the plurality of primary flash-based storage devices does not house a cache subsystem.

\* \* \* \* \*

UNITED STATES PATENT AND TRADEMARK OFFICE
CERTIFICATE OF CORRECTION

PATENT NO. : 11,334,483 B2
APPLICATION NO. : 16/672029
DATED : May 17, 2022
INVENTOR(S) : Xu Chen It is certified that error appears in the above-identified patent and that said Letters Patent is hereby corrected as shown below:

In the Claims

Claim 13, Column 16, Lines 17-18, delete ", that are each separate from".

Signed and Sealed this
Twenty-sixth Day of July, 2022

Katherine Kelly Vidal
*Director of the United States Patent and Trademark Office*